Oct. 11, 1938.   M. A. TORNOW   2,133,124
SAFETY DEVICE FOR GAS SYSTEMS
Filed Nov. 7, 1936   2 Sheets-Sheet 1
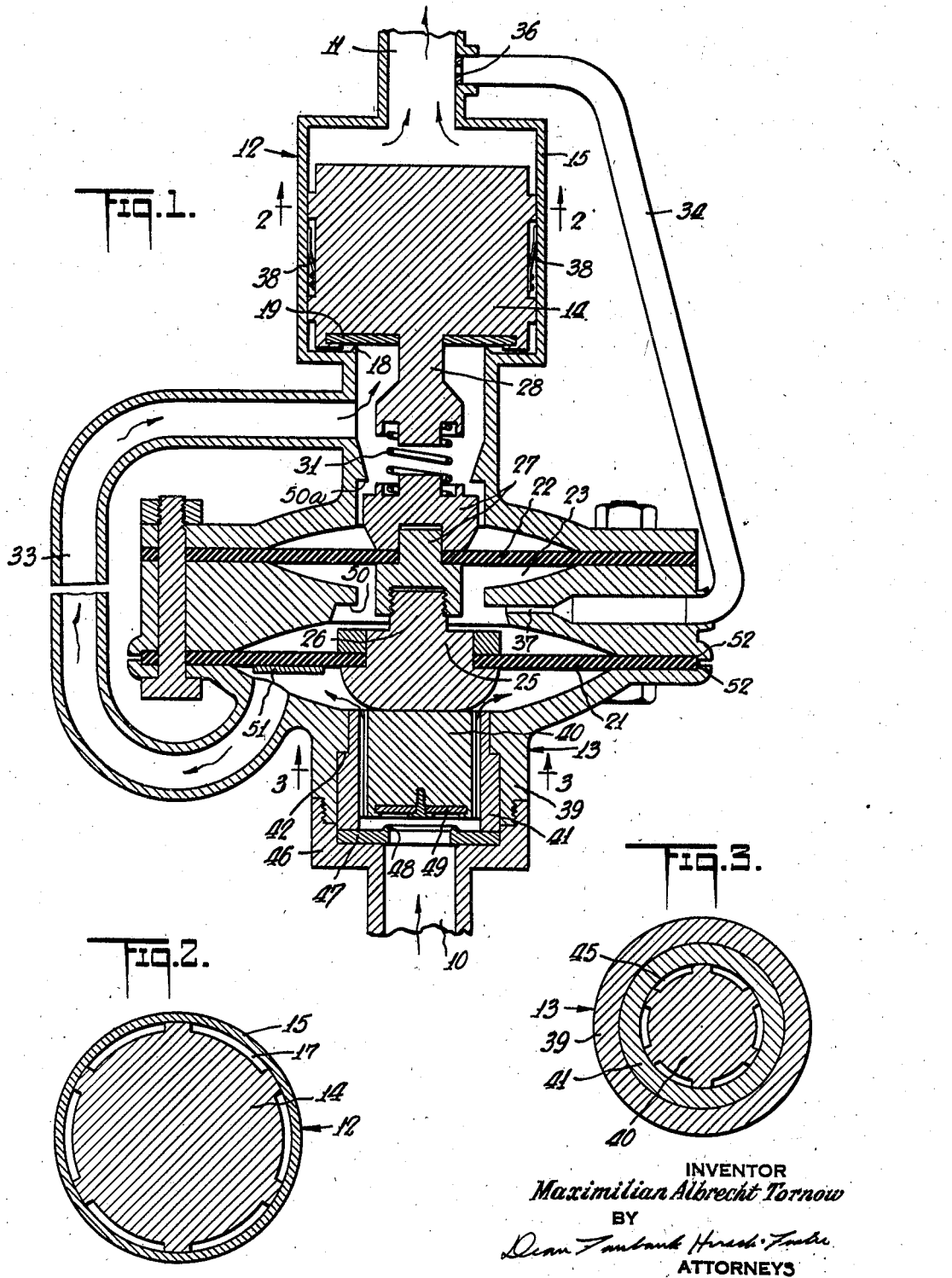
INVENTOR
Maximilian Albrecht Tornow
BY
ATTORNEYS

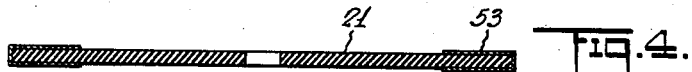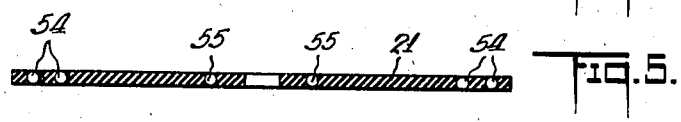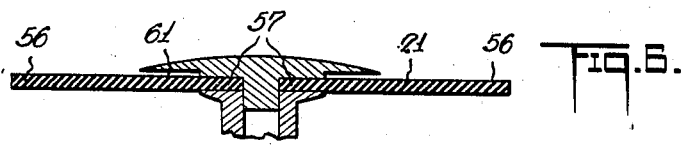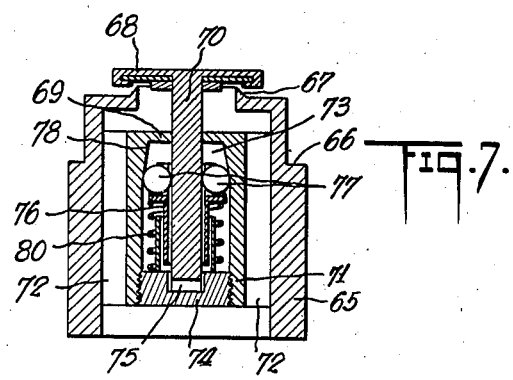

Patented Oct. 11, 1938

2,133,124

UNITED STATES PATENT OFFICE 2,133,124

SAFETY DEVICE FOR GAS SYSTEMS

Maximilian Albrecht Tornow, Berlin-Dahlem, Germany

Application November 7, 1936, Serial No. 109,714
In Germany December 20, 1935

17 Claims. (Cl. 48—192)

Any safety device which is used to prevent back firing into the piping of a combustible gas system, especially an acetylene gas plant, must primarily perform two functions:

(1) It must prevent oxygen from backing or creeping into the piping from the torch or blow pipe even at the lowest combustible gas pressures; and (2) In case the oxygen does find its way into the piping, it must prevent any resultant explosion from backfiring into the generator or storage tank of the gas plant.

Back pressure valves of the hydraulic type have been proposed to perform these functions, but these have certain deficiencies due to the use of water as the agent for shutting off the gas. For instance, if the combustible gas is at very high pressure, the water in these valves is carried along by the gas, thereby creating an undesirable condition. Furthermore, such hydraulic back pressure valves require constant attention with regard to their water contents, and therefore there is no assurance that these valves are always safe for preventing backfiring.

Many attempts have been made to construct such safety devices so that they would work without the use of any water, that is, by the use of dry back pressure valves. It has been suggested to perform the first function referred to by a back pressure valve fitted with a diaphragm which is responsive to the low pressure of the "creeping" oxygen (i. e., oxygen at low pressure) to operate said valve.

It has been suggested to perform the second function referred to by the use of a back pressure valve controlled by a diaphragm in such a way that any backfiring pressure resulting from an explosion will act on one side of the diaphragm to close the valve on the other side thereof, the explosion flame itself arriving at the valve through a retardation pipe after the valve has been closed. However, neither of these suggestions has as yet been employed in successful commercial constructions.

All safety valves which have hitherto been used for preventing oxygen at low gas pressures from backing up into the piping of a gas plant, are impractical inasmuch as the closing of these valves depends on the very small pressure above atmospheric of the "creeping" oxygen even though diaphragms are associated with the valves. This low pressure above atmospheric has to act on the diaphragm and be transferred by the latter to the back pressure valve. However, such valves do not meet the necessary requirements since the "creeping" oxygen pressure is not sufficient to overcome the friction and other resistances of even the lightest type of valve, and to effect a tight seating of the valve in closed position. On the contrary, the "creeping" oxygen will leak through the most minute openings of the closed valve so that small pressure above atmospheric cannot possibly build up to operate the diaphragm.

In a diaphragm type of valve, the gas tight closing of the valve against the "creeping" oxygen can be obtained only if the closing of this valve does not depend directly on the pressure of the "creeping" oxygen, but is made dependent on the inherent pressure of the valve itself, for instance by the use of a weight or a spring, and if this inherent pressure is sufficiently high to assure a gas sealing tightness of the valve. However, in a valve of such construction, the usual gas pressures, even in the case of compressed acetylene, will not be sufficient to lift the valve into open position against this inherent pressure. For that reason it has heretofore been found impossible to use valves which have such inherent pressures, especially since these valves, during normal operations, should not act to throttle or resist the flow of combustible gas.

One object of the present invention is to provide a safety device which will avoid the disadvantages above referred to.

In carrying out the present invention in the specific embodiments hereinafter described, there is provided a pair of diaphragms which are exposed on their outer ends to the gas pressure, one of them having a larger active area than the other. The space between these diaphragms is connected to the gas outlet pipe, and the pressure differential between these two diaphragms serves to maintain the oxygen check valve open during normal operations. The valve itself has either a spring or such weight that it normally tends to close, so that the pressure equalizing effect of any "creeping" oxygen in the piping system of the valve will cause said valve to close and to prevent further backing of the oxygen into the system.

As another feature of the present invention there is provided a backfiring check valve which is operated by the differential pressure diaphragms referred to, so that in the event of an explosion the pressure produced by such explosion will instantly close this valve.

Another object of the present invention is to prevent creation of suction in a combustible gas piping system so that the leakage of air or the creeping of oxygen into said system due to such suction is eliminated. A device for this purpose may be operated in conjunction with the oxygen and the backfiring check valves referred to.

Various other objects, features and advantages of the invention will be apparent from the following particular description and from an inspection of the accompanying drawings. In these drawings:—

Fig. 1 is a vertical section, somewhat diagrammatic, through one form of safety device embodying the present invention, Figs. 2 and 3 are sections taken on the lines 2—2 and 3—3, respectively, of Fig. 1, Figs. 4, 5 and 6 are sections of various different forms of diaphragms which may be used, and illustrating the manner in which they may be supported to minimize unequal stressing of the same, Fig. 7 is a section showing another form of backfiring check valve which may be used instead of the backfiring check valve shown in the combination of Fig. 1, Fig. 8 is a bottom plan view of the backfiring check valve of Fig. 7, and Figs. 9 and 10 show diagrammatic views of two forms of valves which may be employed for preventing the creation of suction in a gas piping system.

In the specific embodiment of the invention shown in Figs. 1, 2 and 3 there is provided a pipe 10 leading from a gas storage holder or the generator of a gas plant such as an acetylene gas plant, a pipe 11 leading to the manifold to which the hoses of the torches or blow pipes are connected, and a safety device between these pipes including an oxygen check valve 12 and a backfiring check valve 13. The oxygen check valve 12 includes a valve member 14 slidable in a valve casing 15 which communicates with the outlet pipe 11. The casing is shown diagrammatically as though made of a single piece but in actual practice it would comprise a plurality of sections detachably connected to permit easy assembly of the parts and to permit the adjustment of the valve, as will be hereinafter referred to.

The valve member 14 is heavily loaded so that it will be urged into closed position. This loading may be effected by the use of a spring (not shown) acting from above on the valve member 14, or by making said valve member very heavy as shown.

In order to permit the passage of combustible gas through the valve 12 during normal operations, the valve member 14 is provided on the periphery thereof with a series of circumferentially spaced slots 17 cooperating with the casing 15 to form passageways through which the gas may travel to the outlet 11.

The bottom of the valve casing 15 is provided with an annular valve seat 18 which cooperates with a resilient face plate 19 secured to the bottom of the valve member 14 and which forms therewith a gas sealed closure when said valve member 14 is in closed position.

During normal operations, the valve 14 is raised from the valve seat 18 into open position by the pressure of the incoming gas. For that purpose, there is provided a pair of superposed spaced flexible diaphragms 21 and 22 forming a chamber 23 therebetween and clamped around their peripheries to the frame body of the safety device in such a way that the lower diaphragm 21 has a larger exposed area than the upper diaphragm 22. Between the two diaphragms is a pressure transmitter including a member 25, connected to the central portion of the lower diaphragm 21 and having an upwardly extending stud 26 threaded into a socket of a member 27 connected to the central portion of the upper diaphragm 22, so that the two diaphragms are bowed in unison. Extending centrally from the bottom of the valve member 14 is a boss 28 engaging the upper end of a coil spring 31, the lower end of which seats on the upper end of the transmitter member 27.

The chambers on the outer sides of the two diaphragms 21 and 22 are interconnected by a pipe 33 of considerable length relative to the length of the valve proper, and the chamber 23 between the two diaphragms is connected to the outlet pipe 11 by a pipe 34.

During normal operation of the safety device, the combustible gas under pressure flows through the valve chamber of the backfiring check valve 13 and acts on the outer sides of the diaphragms 21 and 22. Since the pressure in the chamber 23 between the two diaphragms is less than that acting on the outside of the lower diaphragm 21, the resultant differential pressure produced on said diaphragms is transmitted upwardly to the valve body 14 through the spring 31 and holds said valve body in open position. If the valve body 14 is in closed position, the pressure in the chamber 23 between the two diaphragms is released or reduced by opening the outlet valve at the torch or blow pipe.

The net pressure effective to move the two diaphragms as a unit may be determined by multiplying the difference in the operating areas of the two diaphragms by the difference between the pressure on the outer surfaces (above the upper and below the lower) and the pressure between the diaphragms. The greater the pressure on the outer surfaces exceeds the pressure between the diaphragms, the greater will be the net pressure tending to lift the two diaphragms as a unit.

If oxygen should begin to back up into the piping system from the oxygen supply tank or other source, the pressure is equalized throughout this system so that the resultant equalized pressure on the two diaphragms 21 and 22 will permit the valve body 14 to drop under its own weight upon the valve seat 18 with enough pressure to form a tight gas seal, and thereby check the further backing of the oxygen into the piping system.

As an important feature of the present invention, the pipe 34 is throttled at various sections thereof, as for instance at the top, by an orifice plate 36 and at the bottom by a restricted section 37 so that any fluctuation in pressure in the pipe 11 does not cause a corresponding fluttering of the oxygen check valve 12. This throttling of the pipe 34 serves the further function of permitting only a small amount of gas to reach the blow pipes or torches in case the diaphragms 21 and 22 should be damaged, so that any such damage would be easily discernible.

The fluttering of the valve 14 may be further prevented by providing a series of brake springs 38 which are connected to the valve body 14 and which act against the inner periphery of the valve casing 15. The breaking effect of these springs 38 may be adjusted in any suitable manner as for instance by removing the valve body 14 from the valve casing 15, and bending these springs to the desired extent.

The backfiring check valve 13, in the form shown in Figs. 1 and 3, comprises a valve member 40 slidable in a valve chamber defined by a sleeve 41 detachably connected to the valve frame 39, the position of said sleeve with respect to said valve frame being defined by a shoulder 42 on said sleeve abutting a corresponding shoulder formed on said valve frame. The valve member 40 has a tight slidable fit with the inner periphery of the sleeve 41 and is fluted to form a series of passageways 45 through which the gas may pass when said valve member is in open position.

Detachably clamped between the bottom of the sleeve 41 and the socket of the coupling 46 forming part of the inlet pipe 10 is a ring 47 presenting a V-shaped annular valve seat 48 adapted to cooperate with a face plate 49 of comparatively soft material such as rubber or lead, detachably connected to the bottom of the valve member 40. During normal operations, the valve member 40 is in open position shown in Fig. 1 and is retained in said position by its frictional engagement with the sleeve 41.

In case of an explosion in the piping system on the outlet side of the safety device, the increased pressure resulting from this explosion will immediately act on the diaphragms 21 and 22 either by an increase in pressure in the chamber 23 between these diaphragms or by an increase in pressure acting on the upper side of the diaphragm 22, and move these two diaphragms downwardly in unison, so that the member 25 engaging the upper end of the valve member 40 will move said valve member downwardly and firmly press it on the valve seat 48. The bottom of the member 25 is preferably convexly curved at the corners to prevent the jamming of this transmitter in the valve chamber of the check valve 13. The flame resulting from the explosion and traveling through the flame retardation or delay pipe 33 will have a long path of travel of considerable length relative to the length of the valve proper so that by the time it reaches the underside of the diaphragm 21 the valve member 40 will have been closed, thereby preventing the explosion flame from passing beyond the valve 13. By retardation pipe is meant a pipe which affords a long path of travel for a flame therethrough so that a substantial period of time will elapse for the flame to travel the full length of said pipe.

The coil spring 31 should be strong enough to transfer the pressure above atmospheric from the two diaphragms 21 and 22 to the valve member 14 without compressing said spring too much, and weak enough to permit the pressure transmitter 25, 27 to be moved against its static inertia in case of an explosion, so that the diaphragms will yield against the balancing action of said spring and will not be ruptured or unduly distorted.

In order to protect the diaphragms against extreme destructive bending resulting from the impact of the explosion gas emerging from the lower end of the retardation pipe 33, the frame body of the safety device is provided with limit stops 50 and 50a in the path of upward movement of the pressure transmitter members 25 and 27.

In order to avoid any damaging of the diaphragms by a high back pressure or by an explosion, fixed or movable traps, sieves or reenforcing members are used to dissipate the impact forces of the gas. In the specific form shown in Fig. 1, the diaphragm 21 is provided on its underside above the lower end of the retardation pipe 33 with a circular metal plate 51 glued or otherwise secured to said diaphragm and serving to reenforce said diaphragm at that section where it receives the full impact of the gases emerging from the lower end of said pipe 33. Similar results may be obtained by directing the pipe end in a direction substantially parallel to the diaphragms as shown by the pipe section 37, so that the gases emerging from said pipe end do not impinge directly on said diaphragms.

After the valve member 40 has been moved into closed position, it may be reset into the open position shown in Fig. 1, by disconnecting the coupling 46 and manually pushing said valve member upwardly to the limiting position determined by the pressure transmitter 25. The valve member 40 will be retained in this latter position by its frictional engagement with the sleeve 41. If desired, springs similar to the springs 38 may be utilized to retain the valve member 40 in open position.

If the diaphragms 21 and 22 were made of soft and elastic material, such as rubber, these diaphragms would be crushed between the clamping members at their centers and peripheries to such an extent as to greatly impair their efficient operation. In order to avoid such strains in these diaphragms, the clamping portion of the frame body of the safety device is provided in the construction of Fig. 1, with radially inwardly facing annular shoulders 52 which engage the periphery of the diaphragm 21 and prevent the clamped portion of this diaphragm from being unduly thinned out and strained. The diaphragm 22 may be similarly protected against the crushing action of its peripheral support.

In the construction shown in Fig. 4 there are provided U-shaped metal clamping rings 53 which serve to prevent the diaphragms from being unduly compressed at their peripheries.

In the construction of Fig. 5, there are provided metal balls 54 and 55 for preventing the crushing of the diaphragms at their peripheries and at their central portions, respectively.

In Fig. 6, protection against undue compression of the diaphragms is effected by making their peripheral portions 56 and the central portions 57 of the diaphragms of hard rubber.

Undue straining of the diaphragm is also effected when the diaphragm is clamped between two surfaces of different areas and shapes. If the two clamping surfaces are of different areas, the portion of the surface of the larger clamping member extending beyond the periphery of the clamping area of the other member, is offset to form a space 61 as shown in Fig. 6, so that the two clamping surfaces will be equal in size and shape.

In Figs. 7 and 8 there is shown another form of backfiring check valve which may be used in place of the check valve 13. In this construction, there is provided means for locking the backfiring check valve in closed position, said locking means being enclosed in a chamber apart from the flowing gas, so that the safe working of this locking means is assured. This backfiring check valve includes a sleeve 65 having a shoulder 66 for predetermining its position with respect to the valve frame 39 as in the case of the sleeve 41 of Fig. 1, and presents at its upper end a V-shaped annular valve seat 67 cooperating with a valve head 68 connected to the upper end of a valve stem 70 slidable in a guide member 71. This guide member 71 is provided with a series of bores 72 serving as passageways for the incoming gas, and defines a chamber 73 closed at the bottom by a screw plug 74 having a central socket 75 for receiving the lower end of the valve stem 70, and at the top by a wall 69.

The locking means for the valve head 68 includes a sleeve 76 in the interior of the chamber 73, slidably encircling the valve stem 70, and carrying at its upper end a series of balls 77 adapted to be wedged between the periphery of said valve stem and a conical surface 78 in the inner wall of the guide member 71. These wedge balls 77 are urged upwardly against the conical surface 78 by a coil spring 80.

During normal operations, the check valve of Figs. 7 and 8 will be in the open position shown, with the valve head 68 spaced from the valve seat 67. Upon the creation of an explosion, the pressure produced thereby immediately causes the downward movement of the diaphragm 21, and the pressure transmitter 25 abutting the valve head 68 forces it downwardly against the seat 67 into closed position. This valve head 68 will be locked in this closed position by the jamming of the balls 77 between the periphery of the valve stem 70 and the conical surface 78. In order to move the valve head 68 into open position for resumption of normal operations, the coupling 46 is disconnected, the plug 74 removed, and the valve head 68 lifted manually into the open position shown in Fig. 7.

Fig. 9 shows a device that may be attached to avoid the creation of suction in the piping system, which might be transferred to the gas generator or gas holder, and which might cause air to leak into said system, as for instance through the torches or the blow pipes. This device may be placed at the inlet or outlet side of the safety device of Fig. 1, and includes a diaphragm 85 clamped around its periphery in a casing 86, one side 87 of which is imperforate and forms a chamber 84 with one side of the diaphragm, while the other side 88 of said casing is perforated to subject the other side of said diaphragm to atmospheric pressure, and serves to limit the bulging of said diaphragm. This chamber 84 has an outlet 89 leading into the atmosphere and controlled by a valve 90 connected to the central portion of the diaphragm 85, and communicates with the outlet pipe 11 through a pipe 91. As long as the pressure in the outlet pipe 11 is above atmospheric, this pressure acting upon the upper side of the diaphragm 85 holds said diaphragm in position to close the valve 90. As soon as a vacuum is created in the outlet pipe 11, the greater atmospheric pressure acting on the bottom side of the diaphragm 85 will cause the valve 90 to be moved into open position, so that atmospheric air is permitted to enter the chamber 84 and raise the pressure in the piping system to that of the atmosphere.

If the blowpipe develops any suction action it is however much better to prevent the suction effect from extending beyond the back pressure valve by tightly closing said valve. Thus, the vacuum will exist only in the piping, and if the suction effect stops, air can get into the piping only through the blow pipe. In this way it is impossible for a mixture of gas and air to be formed in the piping, as air entering the piping from the blow pipe end, will push a body of gas along in front, and this gas will collect adjacent to the back pressure valve, and any explosion from the side of the blow pipe will not advance even as far as the back pressure valve.

Without adding any special device, the diaphragms of the safety device made in accordance with this invention, will always react, if the difference between the pressures is sufficient before and behind the oxygen check valve 12 which is closed in the state of rest, and it is not material whether the difference be produced by a pressure above atmospheric from the side of the generator, or by the suction effect from the blow pipe. It is therefore essential that the new device allow the gas to pass, only if the total pressure difference is above atmospheric.

In Fig. 10 there is shown means whereby the creation of a suction in the piping system acts on the oxygen check valve 12 to close said valve and prevent the vacuum from being transmitted past said oxygen check valve. For that purpose, there is provided a diaphragm 95 clamped around its periphery to a valve casing 96 having an imperforate section 97 forming a chamber 94 with the bottom side of the diaphragm, and a perforated section 98 on the opposite side so that the upper side of the diaphragm is under atmospheric pressure. The chamber 94 communicates with the valve chamber of the oxygen check valve 12 through a passageway 101 which in turn communicates with the outlet 11 by a pipe 102.

Connected centrally of the diaphragm 95 is a push rod 103, the lower end of which is adapted to engage the upper end of the valve body 14. When the pressure in the outlet 11 falls below the atmosphere, the diaphragm 95 is bulged downwardly to cause the corresponding downward movement of the push rod 103 which, acting on the upper end of the valve body 14, pushes said body downwardly into closed position, so that the vacuum is not permitted to travel beyond the check valve 12.

Having thus described my invention, what I claim as new and desire to secure by Letters Patent is:—

1. A safety device for preventing oxygen from backing up into a combustible gas piping system including a valve loaded for closing action, a pair of superposed spaced diaphragms of different pressure areas operable in unison for controlling the operation of said valve, a pipe interconnecting the two spaces on the outer sides of said diaphragms, and a pipe connecting the space between said diaphragms and the outlet side of said valve.

2. A safety device for preventing oxygen from backing up into a combustible gas piping system, including a valve loaded for closing action, a pair of superposed spaced diaphragms of different pressure areas operable in unison for controlling the operation of said valve, a pipe connecting the space between said diaphragms and the outlet side of said valve, and having a volume larger than the volume of the space between said diaphragms, and throttling means in said pipe.

3. A safety valve for preventing oxygen from backing up into a combustible gas piping system, including a valve loaded for closing action, a pair of superposed spaced diaphragms of different pressure areas operable in unison for controlling the operation of said valve, a pipe connecting the space between said diaphragms and the outlet side of said valve, and having a volume larger than the volume of the space between said diaphragms, and throttling means at the ends of said pipe whereby the fluttering of said valve due to variations in pressure in said pipe is minimized.

4. A device for preventing oxygen from backing up into a combustible gas piping system, and for preventing backfiring into said system, including an oxygen check valve loaded for closing action, a backfiring check valve, a pair of spaced diaphragms of different pressure areas for controlling the operation of said valves, and a flame retardation pipe interconnecting the two spaces on the outer sides of said diaphragms.

5. A safety device for preventing backfiring into a combustible gas piping system, including a backfiring check valve, a pair of spaced diaphragms of different pressure areas for controlling the operation of said valve, pressure transmitting members connected respectively to the central portions of said diaphragms, and interconnected whereby said diaphragms operate in unison, a flame retardation pipe interconnecting the two spaces on the outer sides of said diaphragms, and limit stops for engaging said members to limit the extent of bulging of said diaphragms under the impact of an explosion.

6. A safety device for preventing oxygen from backing up into a combustible gas piping system, and for preventing backfiring into said system, including an oxygen check valve, a backfiring check valve, a pair of superposed spaced diaphragms of resilient material for controlling the operation of said valves, and interconnected pressure transmitting members secured respectively to the central portions of said diaphragms, one of said pressure transmitting members having a pair of detachably interconnected sections respectively presenting surfaces which face their associated diaphragm and which are of different areas, said surfaces having diaphragm clamping portions, the larger surface having the portion thereof extending beyond the periphery of the clamping portion of the other section spaced from the diaphragm, whereby said clamping portions will be of equal areas and of similar shapes.

7. A safety device for preventing oxygen from backing up into a combustible gas piping system, and for preventing backfiring into said system, including an oxygen check valve, a backfiring check valve, a pair of superposed spaced diaphragms made of resilient material for controlling the operation of said valves, means for clamping the peripheries of said diaphragms in fixed position, and means for preventing the undue crushing of said diaphragms at their clamped sections.

8. A safety device for preventing oxygen from backing up into a combustible gas piping system, and for preventing backfiring into said system, including an oxygen check valve, a backfiring check valve, a pair of superposed spaced diaphragms made of resilient material for controlling the operation of said valves, and means for clamping one of said diaphragms in fixed position, said clamping means presenting a shoulder engaging the peripheral edge of said latter diaphragm to prevent undue crushing of the peripheral portion of said latter diaphragm in said clamping means.

9. A safety device for preventing oxygen from backing up into a combustible gas piping system, and for preventing backfiring into said system, including an oxygen check valve, a backfiring check valve, a pair of superposed spaced diaphragms made of resilient material for controlling the operation of said valves, and means for clamping said diaphragms in fixed position, said means including U-shaped metal rings engaging the peripheral portions of said diaphragms.

10. A safety device for preventing oxygen from backing up into a combustible gas piping system, and for preventing backfiring into said system, including an oxygen check valve, a backfiring check valve, a pair of superposed spaced diaphragms made of resilient material for controlling the operation of said valves, means for clamping the peripheries of said diaphragms in fixed position, pressure transmitting members clamped on the central portions of said diaphragms, and hard bodies on said diaphragms in the clamped portions thereof for limiting the clamping pressure on said diaphragms.

11. A safety device for preventing oxygen from backing up into a combustible gas piping system, and for preventing backfiring into said system, including an oxygen check valve, a backfiring check valve, a pair of superposed spaced diaphragms made of resilient material for controlling the operation of said valves, means for clamping the peripheries of said diaphragms in fixed position, pressure transmitting members clamped on the central portions of said diaphragms, and metal balls embedded in said diaphragms in the clamped portions thereof for limiting the clamping pressure on said diaphragms.

12. A safety device for preventing oxygen from backing up into a combustible gas piping system, and for preventing backfiring into said system, including an oxygen check valve, a backfiring check valve, a pair of superposed diaphragms made of resilient material for controlling the operation of said valves, means for clamping the peripheries of said diaphragms in fixed position, and pressure transmitting members clamped on the central portions of said diaphragms, the clamped sections of said diaphragms being made of harder material than the rest of the diaphragms to limit the clamping strain at said sections.

13. A safety device for preventing backing up of oxygen into a combustible gas piping system, and for preventing backfiring into said system, including an oxygen check valve, a backfiring check valve, a pair of spaced diaphragms operable in unison and adapted to control the closing of said backfiring check valve, and a pressure spring between one of said diaphragms and said oxygen check valve for controlling the operation of said oxygen check valve.

14. A safety device for preventing backing up of oxygen into a combustible gas piping system, and for preventing backfiring into said system, including an oxygen check valve, a backfiring check valve, a pair of superposed spaced diaphragms operable in unison for controlling the operation of said valves, a flame retardation pipe interconnecting the two spaces on the outer sides of said diaphragms, and a pipe connecting the space between said diaphragms and the outlet side of said oxygen check valve, one of said pipes leading into one of said spaces adjacent to one of the diaphragms at an angle substantially parallel to said latter diaphragm whereby the gases emerging from said latter pipe into said spaces will not impinge directly upon said latter diaphragm.

15. A safety device for preventing backing up of oxygen into a combustible gas piping system, and for preventing backfiring into said system, including an oxygen check valve, a backfiring check valve, a pair of superposed spaced diaphragms operable in unison for controlling the operation of said valves, a flame retardation pipe interconnecting the two spaces on the outer sides of said diaphragms, a pipe connecting the space between said diaphragms and the outlet side of said oxygen check valve, and means in one of said spaces for dissipating the impact of gases emerging from one of said pipes leading into said spaces whereby the full force of the gases emerging from said latter pipe into said space will not unduly strain the diaphragm in said latter space.

16. A safety device for preventing backing up of oxygen into a combustible gas piping system, and for preventing backfiring into said system, including an oxygen check valve, a backfiring check valve, a pair of differential pressure diaphragms between said valves and operable in unison for controlling the operation of said valves, and a diaphragm controlled valve for admitting atmospheric air into said piping system when the pressure in said system falls below atmospheric.

17. A safety device for preventing backing up of oxygen into a combustible gas piping system, and for preventing backfiring into said system, including an oxygen check valve, a backfiring check valve, a pair of differential pressure diaphragms between said valves and operable in unison for controlling the operation of said valves, and a diaphragm controlled valve on the outlet side of said oxygen check valve and operable to close said oxygen check valve when the pressure in said piping system falls below atmospheric.

MAXIMILIAN ALBRECHT TORNOW.